March 13, 1962 M. WATTER 3,024,938
SECTIONAL PRESSURE VESSEL AND METHOD OF MAKING IT
Filed July 27, 1959
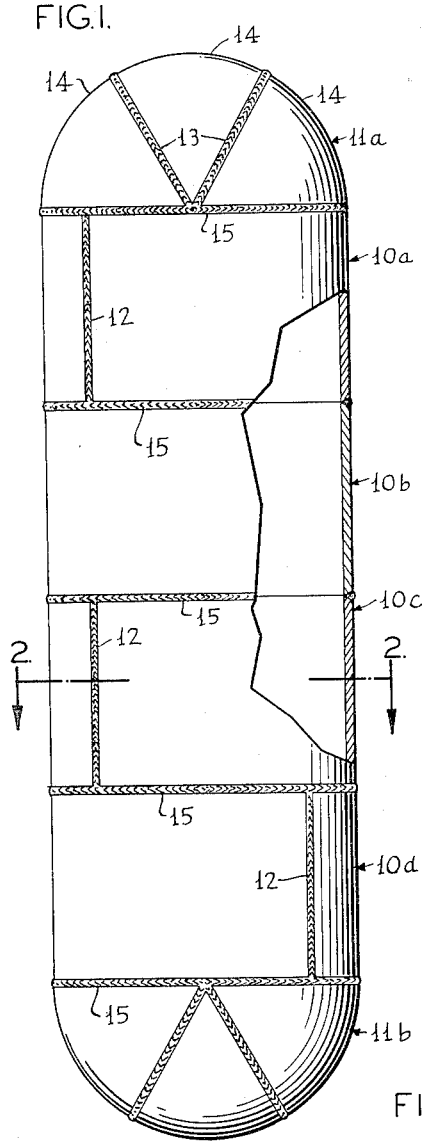
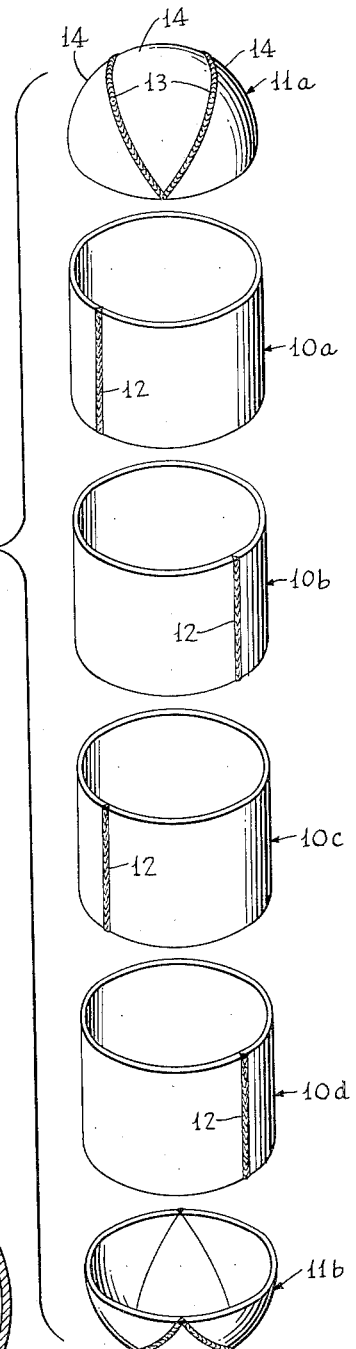
INVENTOR:
MICHAEL WATTER
BY Wm. R. Glasson
ATTY United States Patent Office 3,024,938
Patented Mar. 13, 1962

3,024,938
SECTIONAL PRESSURE VESSEL AND
METHOD OF MAKING IT
Michael Watter, Philadelphia, Pa., assignor to The Budd Company, Philadelphia, Pa., a corporation of Pennsylvania
Filed July 27, 1959, Ser. No. 829,600
2 Claims. (Cl. 220—5)

This invention relates to a sectional pressure vessel and method of making it and has for an object the provision of improvements in this art.

One of the particular objects is to make a sectional pressure vessel composed of longitudinally welded sections treated for strength improvement and circumferentially welded together without such treatment.

Another object is to provide a method of making sectional pressure vessels by welding sections along longitudinal lines, treating the sections to increase their strength, and welding the sections together along circumferential lines. This is especially advantageous when making vessels which are too large to be treated as a whole for strength increase.

Another object is to provide heads for a sectional pressure vessel which are so formed and treated as to have increased strength and to be easily assembled in accordance with the invention.

The above and other objects and various advantages of the invention will be apparent from the following description of an exemplary embodiment, reference being made to the accompanying drawings wherein:

FIG. 1 is a side elevation, partly broken away to show in section, of a completed pressure vessel embodying the present invention;

FIG. 2 is a transverse section taken along the line 2—2 of FIG. 1 and

FIG. 3 is a view showing the sections in position to be joined to form the complete vessel.

There are many situations which call for pressure vessels of very high strength and as nearly uniform strength as possible.

There are many metals which are susceptible to strength increase by proper treatment, some by heat treatment and some by cold-working. Peening and cold-rolling are common forms of cold-working. The characteristics and requirements of various metals are well known to metallurgists and others who deal with them and need not be detailed here. My handbook, "Strength of Stainless Steel Structural Members as Function of Design," by Watter and Lincoln, Allegheny Ludlum Steel Corp., Pittsburgh, Pa., 1950, is one of many books on cold-working metals.

After a vessel is fully fabricated it cannot be cold-worked by any common method and it may be too large to be conveniently heat-treated. Its component sections, however, are open and smaller and can be conveniently treated for strength increase, either by heat treatment or cold-working or both.

The present invention takes advantage of the well-known physical law that in pressure vessels the hoop tension is twice the longitudinal tension; that is, for any given internal pressure the unit stress on a longitudinal section is twice as much as the unit stress on a transverse section. So when the vessel is formed with longitudinal and transverse weld lines the longitudinal weld lines are treated for strength increase while the transverse weld lines are left untreated without any sacrifice in the final maximum strength of the vessel.

The vessel shown comprises the cylindrical sections 10a, 10b, 10c and 10d and the header sections 11a and 11b of domed or hemispherical shape.

The cylindrical sections have longitudinal weld lines 12 and the headers have weld lines 13 between lunar-shaped elements 14. The sections are secured together by circumferential weld lines 15. The welding is shown as the added-metal or fusion type, as arc or torch; but resistance welds may be used where the sheet material makes it desirable.

Where final size must be held accurately to specific dimensions this will be taken into account in figuring the original size and strength-increasing treatment since hammering the line of welds, peening the entire section, form-stretching as by cold-working the entire section, or heat-treating the entire section, all may involve dimensional changes.

Since the unit stress on the circumferential seam is only half the unit stress on the longitudinal seam the circumferential seam can be left in the annealed as-welded condition.

The heads are fabricated from small parts when the heads are too large for the available stock width or when the material will not permit a draw of the desired shape. It is usual to make such composite heads of semi-lunes which converge at a pole at the end of the head. In the present case, however, the heads are made more economically by making the heads of full lunes 14 which converge at two poles at opposite ends of a diameter at the base of the head, that is a diameter equal to the diameter of a cylindrical section. The use of full lunes and the orientation of the lunes in the head in the manner disclosed has several advantages.

Two problems exist which must be overcome: The material from which large high pressure vessels are fabricated is only available in rather narrow widths, and the nature of the high strength materials used causes it to be difficult to form. Either one or both problems determine the maximum width of sheet that may be successfully formed. The formerly accepted practice was to diivde the maximum usable width into the circumferential length to obtain the number of semi-lunes required for a hemispherical head of the pressure vessel.

Using 3 foot sheets to fabricate an end head for a ten foot diameter vessel requires eleven semi-lunes, approximately $$\frac{10\pi}{3}$$

Eleven such semi-lunes require approximately $$\frac{110\pi}{4}$$

feet of weld seam to fabricate the end head.

Using the identical limitations of draw and sheet width a hemispherical end head may be fabricated from six full lunes, approximately $$\frac{5\pi}{3}$$

Six such full lunes may be fabricated into a hemispherical head using five seam welds or approximately $25\pi$ feet of weld seam. It should appear obvious that there is always a substantial saving in weld material which may be as much as 100% when two full lunes can be used to make a hemisphere.

In actual practice full lunes are easier to form, assemble, and fabricate than semi-lunes.

As already explained it is intended that the full lunes may be cold-worked to substantially increase their strength. Welding creates a weld seam which is partially annealed, reducing some of the strength gained by cold-working. All longitudinal and head weld seams may be cold-worked to substantially increase the strength of the seams annealed by welding.

It is thus seen that the invention provides a new, efficient and economical pressure vessel structure and an improved method of forming it.

While one embodiment of the invention has been described for purposes of illustration, it is to be understood that there may be various embodiments and modifications within the scope of the invention.

What is claimed is:

1. The method of making a sectionalized cylindrical pressure vessel with domed heads, which comprises, welding each of a plurality of cylindrical sections together along a longitudinal seam, welding full lune head sections together along lines which converge at opposite ends of a base diameter of the head to form head sections, treating each section by cold-working to increase its strength after welding, and welding the treated sections together by untreated circumferential seams.

2. A welded sectionalized cylindrical pressure vessel with domed heads which comprises, a plurality of cylindrical sections joined together by cold-worked welds along a longitudinal seam, a plurality of full lune head sections joined together by cold-worked welds along seam lines which converge at opposite ends of a base diameter of the head to form domed heads, and untreated circumferential seam welds joining said domed heads and said cylindrical sections to form a cylindrical pressure vessel.

References Cited in the file of this patent

UNITED STATES PATENTS

| 1,991,556 | Hopkins | Feb. 19, 1935 |
| 2,118,388 | Zerbe | May 24, 1938 |
| 2,337,049 | Jackson | Dec. 21, 1943 |
| 2,629,354 | Gay | Feb. 24, 1953 |